United States Patent
Hamlett (10) Patent No.: US 8,859,128 B2
(45) Date of Patent: Oct. 14, 2014

(54) ENHANCED THERMAL CONTACT

(75) Inventor: Marina L. Hamlett, Lake Orion, MI (US)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 13/608,239

(22) Filed: Sep. 10, 2012

(65) Prior Publication Data

US 2013/0288098 A1    Oct. 31, 2013

Related U.S. Application Data (60) Provisional application No. 61/640,080, filed on Apr. 30, 2012.

(51) Int. Cl.
*H01M 10/50* (2006.01)
*H01M 10/6554* (2014.01)
*H01M 10/6571* (2014.01)

(52) U.S. Cl.
CPC ...... *H01M 10/5053* (2013.01); *H01M 10/5083* (2013.01)
USPC ......................................... 429/120

(58) Field of Classification Search
CPC ..................... H01M 10/5004; H01M 10/5053; H01M 10/5089
USPC .......................................................... 429/120
See application file for complete search history.

(56) References Cited

U.S. PATENT DOCUMENTS

2010/0035141 A1* 2/2010 Grosvenor ..................... 429/129
2012/0028099 A1* 2/2012 Aoki ............................. 429/120

* cited by examiner

*Primary Examiner* — Nicholas P D'Aniello
(74) *Attorney, Agent, or Firm* — Maginot, Moore & Beck (57) ABSTRACT

A battery module for enclosing at least one battery cell includes a cooling plate. At least one compressible pad is arranged on the cooling plate. The at least one compressible pad has a first surface in contact with the cooling plate and a second surface opposite the first surface arranged to contact the at least one battery cell. A compression limiting device is arranged adjacent to the at least one compressible pad. The compression limiting device has a first surface facing the cooling plate and a second surface opposite the first surface arranged to contact the at least one battery cell. A compressibility of the compression limiting device is less than a compressibility of the at least one compressible pad.

19 Claims, 6 Drawing Sheets

ENHANCED THERMAL CONTACT

CROSS-REFERENCE TO RELATED APPLICATIONS

This application claims the benefit of U.S. Provisional Application No. 61/640,080 filed on Apr. 30, 2012. The disclosure of the above application is incorporated herein by reference in its entirety.

FIELD

The present disclosure relates to battery packs for vehicles, and more particularly to battery packs including structures for retaining a plurality of battery cells.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Battery systems may be used to provide power in a wide variety of applications. Exemplary transportation applications include hybrid electric vehicles (HEVs), electric vehicles (EVs), heavy duty vehicles (HDVs) and vehicles with 42-volt electrical systems. Exemplary stationary applications include backup power for telecommunications systems, uninterruptible power supplies (UPS), and distributed power generation applications.

A battery system may include a battery pack that includes one or more battery modules or subpacks that are connected in series and/or in parallel. Each of the battery modules may include one or more high-voltage battery cells that are electrically connected in parallel and/or in series and mechanically linked together to form a self-supporting assembly. Example battery cells include nickel metal hydride (NiMH) cells, lead-acid cells, lithium ion cells, and other types of battery cells.

The battery modules may include endplates and sideplates. The endplates and sideplates are placed around a plurality of cells to form an enclosure to band the cells together. One or more of the battery modules may be arranged on a cooling plate within the battery pack.

SUMMARY

A battery module for enclosing at least one battery cell includes a cooling plate. At least one compressible pad is arranged on the cooling plate. The at least one compressible pad has a first surface in contact with the cooling plate and a second surface opposite the first surface arranged to contact the at least one battery cell. A compression limiting device is arranged adjacent to the at least one compressible pad. The compression limiting device has a first surface facing the cooling plate and a second surface opposite the first surface arranged to contact the at least one battery cell. A compressibility of the compression limiting device is less than a compressibility of the at least one compressible pad.

A method for assembling a battery module for enclosing at least one battery cell includes arranging at least one compressible pad arranged on a cooling plate, the at least one compressible pad having a first surface in contact with the cooling plate and a second surface opposite the first surface arranged to contact the at least one battery cell, and arranging a compression limiting device adjacent to the at least one compressible pad. The compression limiting device has a first surface facing the cooling plate and a second surface opposite the first surface arranged to contact the at least one battery cell. A compressibility of the compression limiting device is less than a compressibility of the at least one compressible pad.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Figure 1:
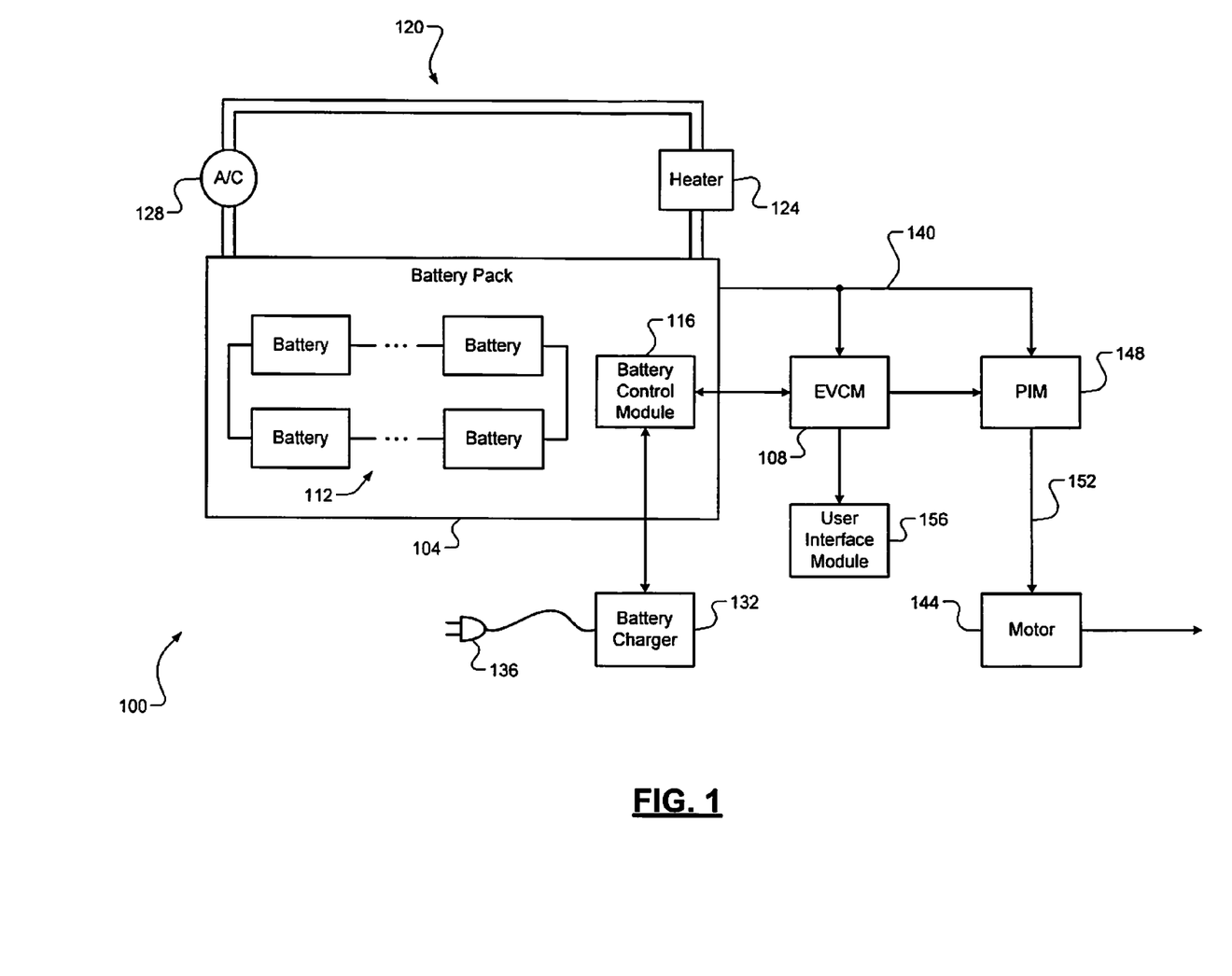
FIG. 1 is a functional block diagram of an electric vehicle including a battery pack according to the principles of the present disclosure.

Referring now to FIG. 1, an electric vehicle 100 includes a battery pack 104 and an electric vehicle control module (EVCM) 108. The battery pack 104 includes one or more battery modules 112, each including one or more battery cells, and a battery control module 116. The battery control module 116 controls various functions of the battery pack 104 and monitors and collects various characteristics of the battery pack 104. For example, the battery control module 116 monitors characteristics including, but not limited to, a voltage, a current, and a temperature associated with the battery pack 104. The battery control module 116 may determine performance variables of the battery pack 104 based on the characteristics. For example only, the battery control module 116 may estimate a state of charge (SOC) of the battery pack 104 based on the voltage, current, and temperature of the battery pack 104.

The battery control module 116 may initiate heating and/or cooling of the battery pack 104 based on the temperature. For example, a coolant system 120 may provide liquid coolant that flows through the battery pack 104 to heat and cool the battery pack 104. The coolant system 120 may include a heater 124 that heats the coolant when the temperature of the battery pack 104 is less than a low temperature threshold, and an air conditioner/compressor 128 that cools the coolant when the temperature of the battery pack 104 is greater than a high temperature threshold.

The battery control module 116 communicates with battery charger 132. The battery charger 132 charges the battery pack 104 and may include a user interface (not shown) for providing visual indications of the condition of the battery pack 104 (e.g., the SOC of the battery pack 104). The battery charger 132 includes a plug 136 that interfaces with a power source (not shown) to provide charging power to the battery pack 104 via the battery charger 132.

The EVCM 108 communicates with the battery pack 104 and the battery control module 116 to control various functions of the vehicle 100. For example, the EVCM 108 receives a voltage 140 from the battery pack 104. Conversely, the EVCM 108 receives information from the battery control module 116 related to, for example only, the monitored characteristics of the battery pack 104 and functions of the battery control module 116, the coolant system 120, and the battery charger 132.

The EVCM 108 controls a motor 144 of the vehicle 100 via a power inverter module (PIM) 148. The PIM 148 converts a direct current (DC) voltage (e.g., the voltage 140) to an alternating current (AC) voltage 152 and provides the AC voltage 152 to the motor 144. The motor 144 provides rotational force to drive wheels (not shown) of the vehicle 100. The EVCM 108 may communicate with a user interface module 156 to indicate a status of the vehicle 100 (e.g., a status of the battery pack 104). For example, the user interface module 156 may indicate that the vehicle 100 should be plugged in to charge the battery pack 104.

Figure 2:
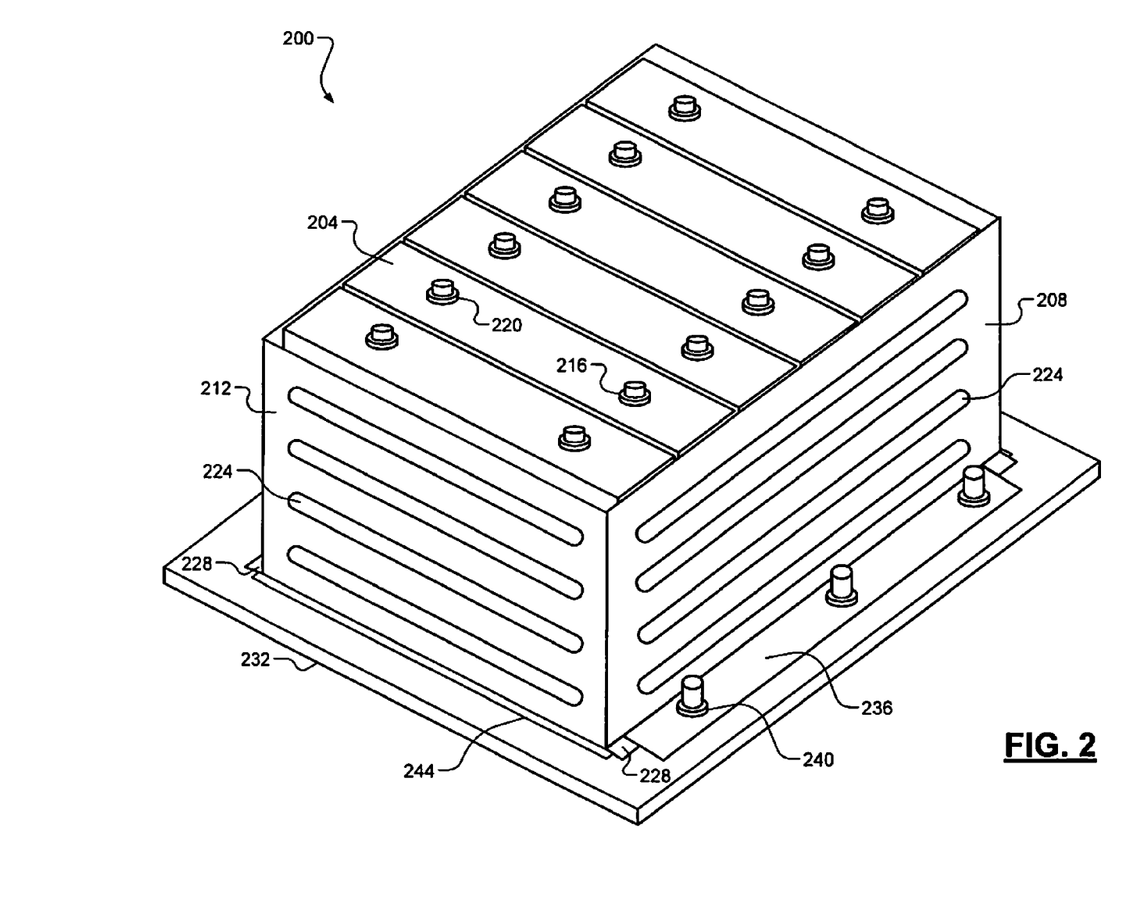
FIG. 2 illustrates a battery module according to the principles of the present disclosure.

Referring now to FIG. 2, an example battery module 200 (e.g., the battery modules 112 as shown in FIG. 1) includes a plurality of cells 204, sideplates 208, and endplates 212. The cells 204 may be high-voltage cells (or batteries) such as lithium ion cells. The cells 204 include first terminals 216 and second terminals 220. The first terminals 216 may be positive and the second terminals 220 may be negative, or the first terminals 216 may be negative and the second terminals 220 may be positive. Although the battery module 200 is shown as including six of the cells 204, the battery module 200 may include more or less of the cells 204.

The cells 204 are compressed and banded together using the sideplates 208 and the endplates 212. The sideplates 208 may be formed (e.g., molded) from plastic or formed (e.g., stamped) from metal (e.g., high-strength steel. The endplates 212 may also be formed from plastic or metal. The sideplates 208 and the endplates 212 include stiffening ribs or darts 224. The ribs 224 enable the sideplates 208 and the endplates 212 to restrict swelling or bowing of the cells 204 during service.

The sideplates 208 further include ramped bases 228. The ramped bases 228 may be used to secure the battery module 200 in a vertical direction. As shown in FIG. 1, when the battery module 200 is installed in a vehicle, the battery module 200 may be placed on a base tray 232 and clamp bars 236 may be placed over the ramped bases 228 and fixed to the base tray 232. The clamp bars 236 may be fixed to the base tray 232 using fasteners 240.

Figure 3A:
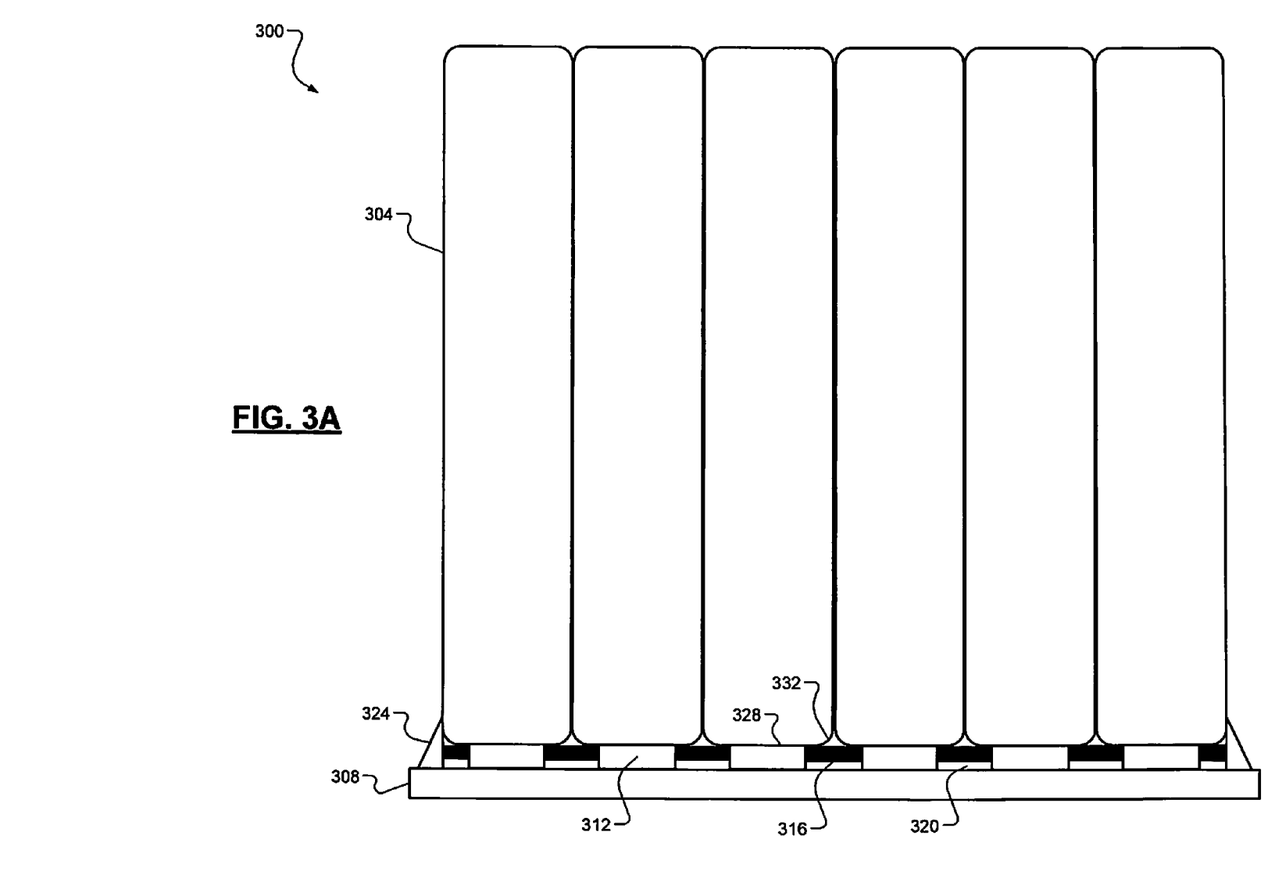
FIGS. 3A and 3B illustrate a battery module including a compression limiting device according to the principles of the present disclosure.

A cooling plate 244 may be arranged between the battery module 200 and the base tray 232. In some implementations, the cooling plate 244 may be used in place of the base tray 232. The cooling plate may be electrically cooled or cooled using coolant. In addition, a thermal interface material (not shown in FIG. 2; described in more detail in FIG. 3) such as one or more elastomeric (e.g., compressible) pads may be inserted between the cooling plate 244 and the cells battery module 200 to improve heat transfer between the cells 204 and the cooling plate 244 and to protect the contact interface for a particle that could create an isolation loss.

When the battery module 200 is compressed in a vertical direction toward the cooling plate 244, the thermal interface material is compressed. A compression limiting device according to the principles of the present disclosure is arranged between the elastomeric pads, and between the battery module 200 and the cooling plate 244, to limit an amount the thermal interface material is compressed.

Figure 3B:
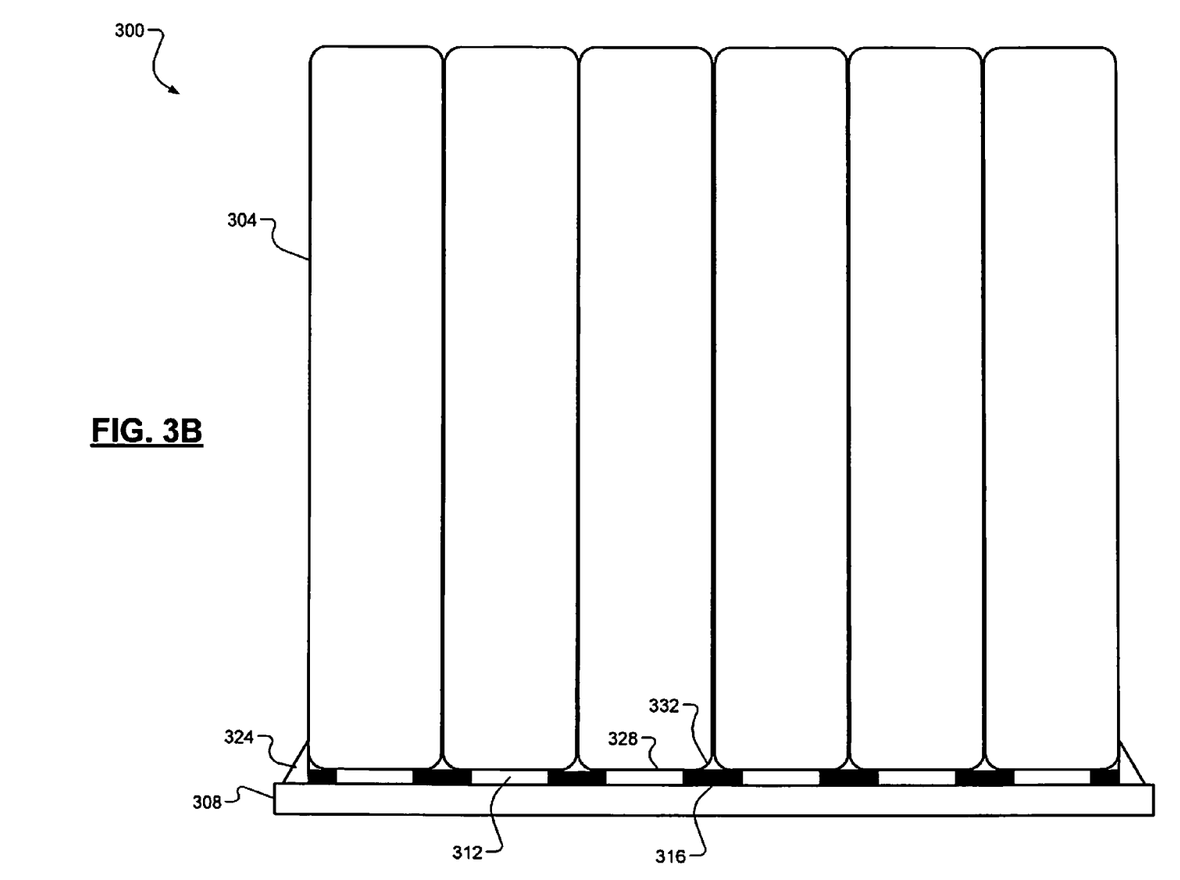

Referring now to FIGS. 3A and 3B, a side view of a battery module 300 including battery cells 304 is shown. The cells 304 are arranged on a cooling plate 308. A thermal interface material such as a plurality of elastomeric pads 312 is arranged between the cells 304 and the cooling plate 308. The pads 312 are thermally conductive and electrically insulative to electrically isolate the cells 304 from the cooling plate 304 while enabling heat transfer from the cells 304 to the cooling plate 308.

When the battery module 300 is compressed in a downward vertical direction toward the cooling plate 308, the cells 304 compress the pads 312 to maximize thermal contact between the cells 304 and the pads 312. Excessive compression of the pads 312 may cause excessive wear on the pads 312. Further, waste particles from manufacturing processes and regular use may interfere with the cells 304 and/or the pads 312. For example, waste particles between bottom edges of the cells 304 and the cooling plate 308 may cause abrasive contact with the bottom edges of the cells 304. The abrasive contact may cause excessive wear on an electrically insulative coating on the cells 304.

Accordingly, a compression limiting device 316 is arranged between the pads 312, and between the cells 304 and the cooling plate 308. The compression limiting device 316 limits an amount that the cells 304 may compress the pads 312 toward the cooling plate 308. The compression limiting device 316 is significantly less compressible than the pads 312, and accordingly may be formed (e.g., molded) from high density polypropylene or another suitably rigid, thermally conductive, and electrically insulative material.

As shown in FIG. 3A, the battery module 300 is shown without downward compression of the cells 304 toward the cooling plate 308. Accordingly, a gap 320 is formed between the compression limiting device 316 and the cooling plate 308. Prior to compression of the cells 304 in the downward direction, a distance between the cells 304 and the cooling plate 308 is A, which may correspond to an uncompressed thickness of the pads 312. A distance between the cooling plate 308 and the compression limiting device 316 is B.

As shown in FIG. 3B, the battery module 300 is shown after the cells 304 are compressed toward the cooling plate 308. The gap 320 is eliminated or reduced, and the distance between the cells 304 and the cooling plate 308 is now approximately a thickness of the compression limiting device 316. In other words, the compression of the cells 304 toward the cooling plate 308 compresses (and reduces the thickness of) the pads 312 and displaces the compression limiting device 316 toward the cooling plate 308 to eliminate the gap 320. When the compression limiting device 316 contacts the cooling plate 308, the non-compressive properties of the compression limiting device 316 prevent further movement of the cells 304 toward the cooling plate 308 and prevent further compression of the pads 312. Accordingly, a post-compression distance D between the cells 304 and the cooling plate 308 corresponds approximately to a thickness of the compression limiting device 316 (where A−B=D), which is approximately equal to a post-compression thickness of the pads 312.

The thickness of the compression limiting device 316 may be selected according to a desired maximum allowable particle size (e.g., allowable according to manufacturing tolerances) in the battery module 300 between the cells 304 and the cooling plate 308. In other words, the thickness of the compression limiting device 316 is selected such that a post-compression distance D between the cells 304 and the cooling plate 308 (and, correspondingly, the post-compression thickness of the pads 312) is greater than or equal to the maximum allowable particle size. As a result, the compression limiting device 316 prevents the cells 304 from being compressed sufficiently close to the cooling plate 308 to cause contact with any waste particles in the battery module 300. Before and/or after compression, a conforming foam seal 324 may be applied around a perimeter of the cells 304, the compression limiting device 316, and the cooling plate 308.

The compression limiting device 316 increases a thermally conductive contact area between the cells 304. For example, an entire bottom surface of each of the cells 304 may be in thermally conductive contact with one of the pads 312 and adjacent portions of the compression limiting device 316. For example only, a width of portions of the compression limiting device 316 between the pads 312 may be greater than a distance between flat contact surface portions 328 of adjacent ones of the cells 304. As shown, bottom portions of the cells 304 may have rounded corners 332. Accordingly, the width of the compression limiting device 316 should be large enough to extend beyond the rounded corners 332 of adjacent cells 304 to ensure contact with respective flat portions 328 of the adjacent cells 304. A width of the pads 312 may be selected such that a surface area of each one of the compressed pads 312 is a predetermined minimum size with respect to a total contact area of the flat portions of the cells 304. For example only, the surface area of each one of the compressed pads 312 is at least 70% of the total contact area of the cells 304.

Figure 4:
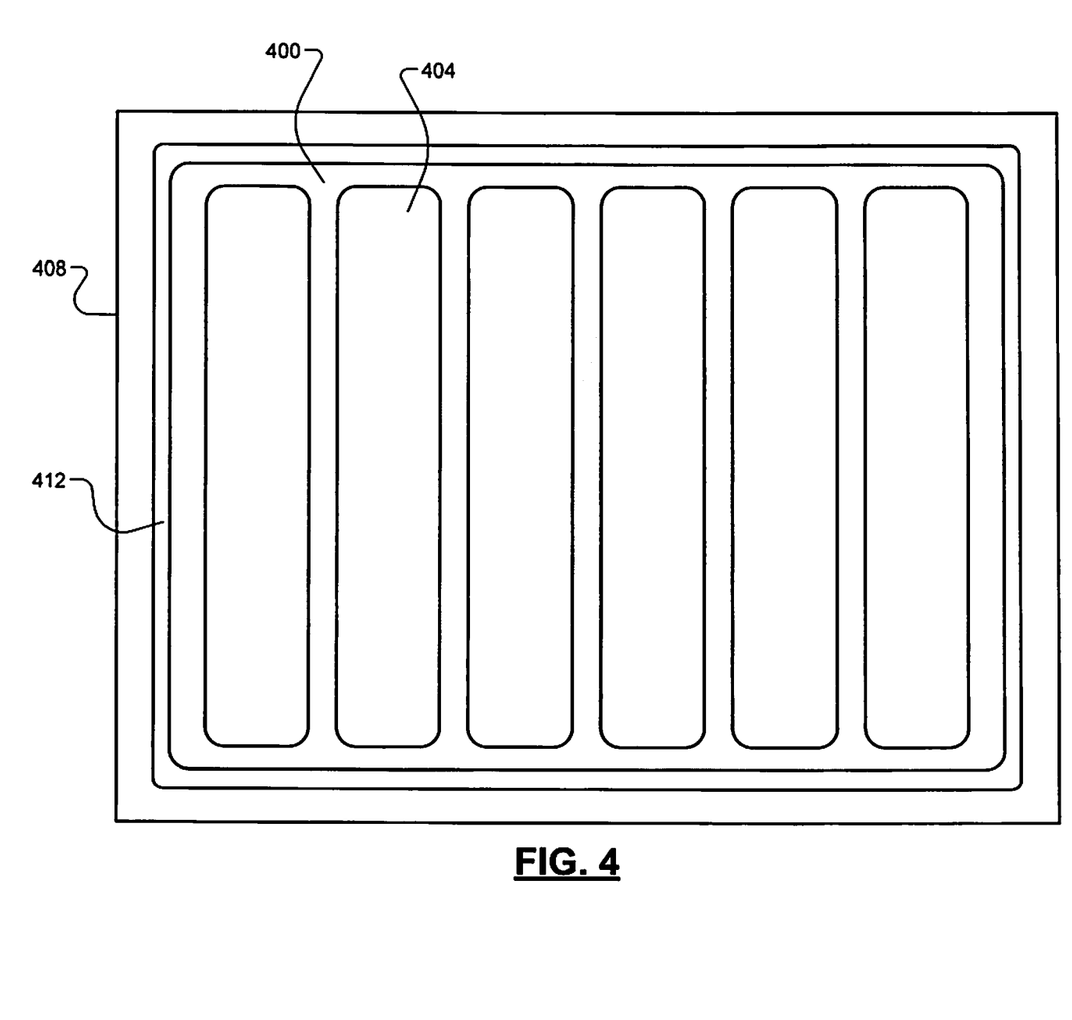
FIG. 4 illustrates a compression limiting device according to the principles of the present disclosure.

Referring now to FIG. 4, a top-down view of an example compression limiting device 400 is shown. Pads 404 are formed on a cooling plate 408. A foam seal 412 may or may not be applied around a perimeter of the compression limiting device 400. As shown, the compression limiting device 400 is contiguously formed as a single element from thermally conductive and electrically insulative material. However, in other implementations, the compression limiting device 400 may include a plurality of devices (e.g., a plurality of individual devices each arranged between adjacent ones of the pads 404).

Figure 5:
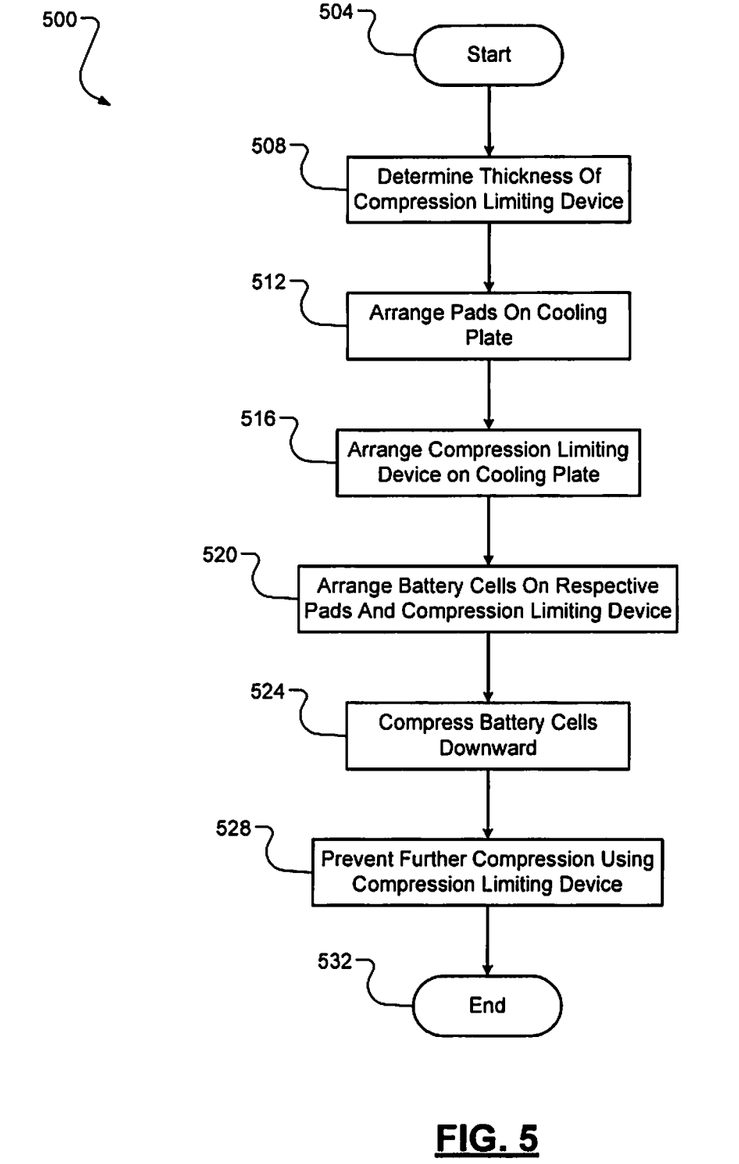
FIG. 5 illustrates a method of assembling a battery module including a compression limiting device according to the principles of the present disclosure.

Referring now to FIG. 5, a method 500 for assembling a battery module including a thermally conductive and electrically insulative compression limiting device begins at 504. At 508, the method 500 determines a thickness of the compression limiting device based on a maximum allowable particle size associated with the battery module. At 512, one or more compressible, thermally conductive, and electrically insulate pads are arranged on a cooling plate of the battery module. At 516, the compression limiting device is arranged on the cooling plate. For example, the compression limiting device may be arranged adjacent to and between a plurality of the pads on the cooling plate. At 520, one or more battery cells are arranged on respective ones of the pads and portions of the compression limiting device adjacent to the pads. At 524, the battery cells are compressed downward toward the cooling plate, compressing the pads. At 528, the compression limiting device prevents the battery cells from further compressing the pads toward the cooling plate. The method 500 ends at 532.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. For purposes of clarity, the same reference numbers will be used in the drawings to identify similar elements. As used herein, the phrase at least one of A, B, and C should be construed to mean a logical (A or B or C), using a non-exclusive logical OR. It should be understood that one or more steps within a method may be executed in different order (or concurrently) without altering the principles of the present disclosure.

As used herein, the term module may refer to, be part of, or include an Application Specific Integrated Circuit (ASIC); an electronic circuit; a combinational logic circuit; a field programmable gate array (FPGA); a processor (shared, dedicated, or group) that executes code; other suitable hardware components that provide the described functionality; or a combination of some or all of the above, such as in a system-on-chip. The term module may include memory (shared, dedicated, or group) that stores code executed by the processor.

The term code, as used above, may include software, firmware, and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

What is claimed is:

1. A battery module for enclosing at least one battery cell, the battery module comprising:
    a cooling plate;
    at least one compressible pad arranged on the cooling plate, the at least one compressible pad having a first surface in contact with the cooling plate and a second surface opposite the first surface arranged to contact the at least one battery cell; and
    a compression limiting device arranged adjacent to the at least one compressible pad, the compression limiting device having a first surface facing the cooling plate and a second surface opposite the first surface arranged to contact the at least one battery cell, wherein the compression limiting device surrounds the at least one compressible pad and a compressibility of the compression limiting device is less than a compressibility of the at least one compressible pad.

2. The battery module of claim 1, wherein a thickness of the compression limiting device is less than a thickness of the at least one compressible pad.

3. The battery module of claim 1, wherein the first surface of the compression limiting device is spaced apart from the cooling plate.

4. The battery module of claim 1, wherein the at least one battery cell is arranged to compress the at least one compressible pad toward the cooling plate and to force the compression limiting device against the cooling plate.

5. The battery module of claim 1, wherein the at least one compressible pad and the compression limiting device are thermally conductive and electrically insulative.

6. The battery module of claim 1, wherein a thickness of the compression limiting device is greater than or equal to a maximum allowable particle size associated with the battery module.

7. The battery module of claim 1, wherein the at least one compressible pad includes a plurality of pads.

8. The battery module of claim 7, wherein the compression limiting device is arranged to surround each of the plurality of pads and fit between adjacent ones of the plurality of pads.

9. A battery module for enclosing at least one battery cell, the battery module comprising:
- a cooling plate;
- at least one compressible pad arranged on the cooling plate, the at least one compressible pad having a first surface in contact with the cooling plate and a second surface opposite the first surface arranged to contact the at least one battery cell; and
- a compression limiting device arranged adjacent to the at least one compressible pad, the compression limiting device having a first surface facing the cooling plate and a second surface opposite the first surface arranged to contact the at least one battery cell, wherein a compressibility of the compression limiting device is less than a compressibility of the at least one compressible pad, wherein a thickness of the compression limiting device is greater than or equal to a maximum allowable waste particle size outside of the at least one battery cell associated with the battery module, and wherein the compression limiting device surrounds the at least one compressible pad.

10. The battery module of claim 9, wherein the thickness of the compression limiting device is less than a thickness of the at least one compressible pad.

11. The battery module of claim 9, wherein the first surface of the compression limiting device is spaced apart from the cooling plate.

12. The battery module of claim 11, wherein the at least one battery cell is arranged to compress the at least one compressible pad toward the cooling plate and to force the compression limiting device against the cooling plate.

13. The battery module of claim 9, wherein the at least one compressible pad and the compression limiting device are thermally conductive and electrically insulative.

14. The battery module of claim 9, wherein the at least one compressible pad includes a plurality of pads.

15. A battery module for enclosing a plurality of battery cells, the battery module comprising:
- a cooling plate;
- a plurality of compressible pads arranged on the cooling plate, each of the plurality of compressible pads having a first surface in contact with the cooling plate and a second surface opposite the first surface arranged to contact a respective one of the plurality of battery cells; and
- a compression limiting device arranged adjacent to each of the plurality of compressible pads, the compression limiting device having a first surface facing the cooling plate and a second surface opposite the first surface arranged to contact each of the plurality of battery cells, wherein a compressibility of the compression limiting device is less than a compressibility of each of the plurality of compressible pads, wherein a thickness of the compression limiting device is greater than or equal to a maximum allowable waste particle size outside of the plurality of battery cells associated with the battery module, and wherein the compression limiting device is arranged to surround each of the plurality of compressible pads and fit between adjacent ones of the plurality of compressible pads.

16. The battery module of claim 15, wherein the thickness of the compression limiting device is less than a thickness of each of the plurality of compressible pads.

17. The battery module of claim 15, wherein the first surface of the compression limiting device is spaced apart from the cooling plate.

18. The battery module of claim 17, wherein each of the plurality of battery cells is arranged to compress a respective one of the plurality of compressible pads toward the cooling plate and to force the compression limiting device against the cooling plate.

19. The battery module of claim 15, wherein each of the plurality of compressible pads and the compression limiting device are thermally conductive and electrically insulative.

* * * * *